United States Patent
Yang et al.

(10) Patent No.: US 12,230,818 B1
(45) Date of Patent: Feb. 18, 2025

(54) VOLTAGE-REDUCED LITHIUM BATTERY AND MANUFACTURING METHOD THEREOF

(71) Applicant: Hamedata Technology Co., Limited, Guangdong (CN)

(72) Inventors: Changjun Yang, Guangdong (CN); Jian Zhao, Guangdong (CN); Pengfei Xiao, Guangdong (CN); Wei Zhou, Guangdong (CN); Guohao Xu, Guangdong (CN); Qiang Hou, Guangdong (CN); Hong Xiao, Guangdong (CN)

(73) Assignee: Hamedata Technology Co., Limited, Guangdong (CN)

( * ) Notice: Subject to any disclaimer, the term of this patent is extended or adjusted under 35 U.S.C. 154(b) by 0 days.

(21) Appl. No.: 18/788,261

(22) Filed: Jul. 30, 2024

Related U.S. Application Data (63) Continuation of application No. PCT/CN2024/096956, filed on Jun. 3, 2024.

(30) Foreign Application Priority Data

Apr. 7, 2024 (CN) .......................... 202410409919.X (51) Int. Cl.
*H01M 50/186* (2021.01)
*H01M 10/052* (2010.01)
(Continued)

(52) U.S. Cl.
CPC ....... *H01M 50/186* (2021.01); *H01M 10/052* (2013.01); *H01M 10/0587* (2013.01);
(Continued)

(58) Field of Classification Search
CPC ............. H01M 50/186; H01M 50/107; H01M 50/528; H01M 50/184; H01M 50/119;
(Continued)

(56) References Cited

U.S. PATENT DOCUMENTS

| | | | |
|---|---|---|---|
| 2016/0254574 A1* | 9/2016 | Li ........................ | G01R 31/36 |
| | | | 320/107 |
| 2019/0207273 A1* | 7/2019 | Chen ................... | H01M 10/425 |

FOREIGN PATENT DOCUMENTS

| | | |
|---|---|---|
| CN | 208225957 U | 12/2018 |
| CN | 113659257 A | 11/2021 |
| CN | 117673498 A | 3/2024 |

OTHER PUBLICATIONS

Office Action received in corresponding Chinese patent application No. 202410409919.X, dated Sep. 25, 2024, 12 pages.

* cited by examiner

*Primary Examiner* — Lingwen R Zeng
(74) *Attorney, Agent, or Firm* — Cooper Legal Group, LLC (57) ABSTRACT

The present application relates to a voltage-reduced lithium battery and a manufacturing method thereof. The voltage-reduced lithium battery includes a circuit assembly, a plastic frame, a wound battery core assembly, a first metal housing, a second metal housing, an insulating seal and an insulating sheath, wherein the circuit assembly and the plastic frame are arranged in the first metal housing, the wound battery core assembly is arranged in the second metal housing, the first metal housing and the second metal housing are in vertical butt connection and fixed by circumferential welding, the insulating seal is configured to seal the second metal housing, and the insulating sheath covers the first metal housing and the second metal housing.

8 Claims, 13 Drawing Sheets

(51) Int. Cl.
  *H01M 10/0587* (2010.01)
  *H01M 10/46* (2006.01)
  *H01M 50/107* (2021.01)
  *H01M 50/119* (2021.01)
  *H01M 50/184* (2021.01)
  *H01M 50/528* (2021.01)
  *H01M 50/536* (2021.01)

(52) U.S. Cl.
  CPC ......... *H01M 10/46* (2013.01); *H01M 50/107* (2021.01); *H01M 50/119* (2021.01); *H01M 50/184* (2021.01); *H01M 50/528* (2021.01); *H01M 50/536* (2021.01)

(58) Field of Classification Search
  CPC ............. H01M 50/536; H01M 10/052; H01M 10/0587; H01M 10/46
  See application file for complete search history.

VOLTAGE-REDUCED LITHIUM BATTERY AND MANUFACTURING METHOD THEREOF

CROSS-REFERENCE TO RELATED APPLICATION

The present application is a continuation of PCT application serial no. PCT/CN2024/096956, filed on Jun. 3, 2024, which claims the priority benefits of China patent application No. 202410409919.X, filed on Apr. 7, 2024. The entireties of PCT application serial no. PCT/CN2024/096956 and China patent application No. 202410409919.X are hereby incorporated by reference herein and made a part of this specification.

FIELD OF THE INVENTION

The present application relates to the field of lithium battery technologies, and in particular, to a voltage-reduced lithium battery and a manufacturing method thereof.

BACKGROUND OF THE INVENTION

Chinese Patent Application No. CN208225957U titled "Rechargeable Lithium Battery with MicroUSB Interface" discloses a constant-voltage lithium battery, in which a constant-voltage protection assembly can achieve the purpose that the battery can always keep a constant output voltage during a working process of outputting electric energy, as well as charging protection, discharging protection, overcurrent protection and short circuit protection to meet a voltage requirement of a user. In this application, a single lithium battery core is a soft-package lithium battery core or a hard-housing lithium battery core which is further sleeved with a steel housing, involving in a high cost. After welded using ultrasonic waves, an upper cover and a lower cover are embedded into the steel housing, resulting in a low strength of connection with the steel housing, and, in turn, tendency to damage. Therefore, there is still a room for improvement.

SUMMARY

In order to solve the technical problems that an existing low-voltage lithium battery has a high cost and is prone to damage, the present invention provides a voltage-reduced lithium battery and a manufacturing method thereof.

In an aspect, the present application provides a voltage-reduced lithium battery, including a circuit assembly, a plastic frame, a wound battery core assembly, a first metal housing, a second metal housing, an insulating seal and an insulating sheath, wherein the circuit assembly and the plastic frame are arranged in the first metal housing, the plastic frame is configured to fix the circuit assembly, the wound battery core assembly is arranged in the second metal housing, the first metal housing and the second metal housing are in vertical butt connection and fixed by circumferential welding, the insulating seal is arranged between the first metal housing and the second metal housing and configured to seal the second metal housing, and the insulating sheath covers the first metal housing and the second metal housing.

In the present application, by adopting the above technical solution, the wound battery core assembly is directly placed in the second metal housing, the plastic frame and the circuit assembly are sealed in the first metal housing, and then, an upper end of the second metal housing is completely sealed by the first metal housing and the insulating seal. The first metal housing and the second metal housing are in vertical butt connection, such that an up-and-down movement amplitude of the wound battery core assembly is controlled. The insulating seal is arranged between the first metal housing and the second metal housing which are then fixed by circumferential welding, such that the first metal housing and the second metal housing have high connection strength, damage is not prone to occurrence, a sealing performance is good, and an electrolyte can be effectively prevented from leaking. A welding spot is covered by the insulating sheath, such that a feeling of a user is not influenced. The plastic frame can achieve an isolation effect to prevent unnecessary contact between the circuit assembly and the first metal housing, a short circuit is not prone to occurrence, and electrical safety is guaranteed. Only one steel housing is provided outside the wound battery core assembly, and compared with the prior art, one steel housing or soft housing is reduced, and a material cost is reduced.

Optionally, a lower end of the first metal housing is provided with a contracted portion, and the insulating seal is partially clamped between the contracted portion and the second metal housing.

Optionally, an outer annular surface of the insulating seal is provided with one or more annular protrusions to increase a sealing performance between the insulating seal and the second metal housing, a horizontal sealing portion also extends inwards from a bottom of the insulating seal, and the horizontal sealing portion is attached to a lower surface of the first metal housing to improve a sealing performance between the horizontal sealing portion and the first metal housing.

Optionally, a positioning hole is formed in a bottom wall of the first metal housing, a metal screw is arranged at the positioning hole, the metal screw is fixed at the positioning hole by a plastic nut, the horizontal sealing portion extends between the metal screw and the bottom wall of the first metal housing and is configured to insulate the metal screw relative to the first metal housing, and the metal screw is also configured to seal the positioning hole; the circuit assembly includes a PCB, a low-voltage positive cap, a high-voltage positive connecting piece, a low-voltage positive elastic connecting piece and a negative elastic sheet, the low-voltage positive elastic connecting piece, the high-voltage positive connecting piece and the negative elastic sheet are welded on the PCB, the negative elastic sheet is in elastic contact with the first metal housing, the high-voltage positive connecting piece is in elastic contact with an upper end of the metal screw, a positive tab of the wound battery core assembly is welded to a lower end of the metal screw, and a negative tab is welded to the second metal housing; the low-voltage positive cap is arranged on the plastic frame, and the low-voltage positive elastic connecting piece is in elastic contact with the low-voltage positive cap.

Optionally, the low-voltage positive elastic connecting piece is a metal elastic sheet, a spring or an elastic ejector pin.

Optionally, the circuit assembly further includes a charging interface, the charging interface is welded on the PCB, and Openings are formed in corresponding positions of the first metal housing and the insulating sheath respectively.

Optionally, the plastic frame includes an upper frame and a lower frame, the upper frame and the lower frame are fixed by clamping, and the PCB is fixed between the upper frame and the lower frame.

Optionally, a spun edge is inwards provided at an upper end of the first metal housing and configured to tightly press the plastic frame, a positive and negative electrode isolating piece is further arranged above or below the spun edge, and part of an upper surface of the positive and negative electrode isolating piece is further wrapped by the insulating sheath.

Optionally, the wound battery core assembly includes a wound battery core, an upper isolating piece and a lower isolating piece, the positive tab penetrates out of a central hole of the upper isolating piece, and an end portion of the positive tab is welded to a lower surface of the metal screw; and the negative tab is wound from a side surface to a bottom surface of the wound battery core, and an end portion of the negative tab is welded to a bottom wall of the second metal housing.

In another aspect, the present application further provides a manufacturing method of the above-mentioned voltage-reduced lithium battery, including:

S1: sleeving the lower end of the first metal housing with the insulating seal, and fixing the metal screw and the plastic nut at the positioning hole of the first metal housing;

S2: fixing the circuit assembly on the plastic frame, then mounting the circuit assembly and the plastic frame into the first metal housing, making the high-voltage positive connecting piece in the circuit assembly elastically contact the metal screw, and making the negative elastic sheet in the circuit assembly elastically contact the first metal housing;

S3: placing the low-voltage positive cap at the plastic frame, making the low-voltage positive cap elastically contact the low-voltage positive elastic connecting piece, manufacturing the spun edge at the upper end of the first metal housing, and tightly pressing the plastic frame and the low-voltage positive cap in the first metal housing;

S4: mounting the wound battery core assembly into the second metal housing, and welding the positive tab of the wound battery core assembly on a bottom surface of the metal screw;

S5: pressing the insulating seal and the lower end of the first metal housing into the second metal housing, and performing circumferential welding on the first metal housing and the second metal housing; and S6: sleeving the obtained assembly with the insulating sheath, and performing heating shrinkage to wrap the insulating sheath on the first metal housing and the second metal housing.

In summary, the present application has at least one of the following beneficial effects.

1. In the present application, the upper end of the second metal housing is completely sealed by the first metal housing and the insulating seal, the sealing performance is good, and the electrolyte can be effectively prevented from leaking; only one steel housing is provided outside the wound battery core assembly, and compared with the prior art, one steel housing or soft housing is reduced, and the material cost is reduced.

2. The insulating seal is arranged between the first metal housing and the second metal housing which are then fixed by circumferential welding, such that the first metal housing and the second metal housing have high connection strength, and damage is not prone to occurrence.

3. The plastic frame can achieve the isolation effect to prevent unnecessary contact between the circuit assembly and the first metal housing, the short circuit is not prone to occurrence, and the electrical safety is guaranteed.

Reference Numerals: 1. Circuit Assembly; 11. PCB; 12. Low-Voltage Positive Cap; 13. High-Voltage Positive connecting piece; 14. Low-Voltage Positive Elastic Connecting Piece; 15. Negative Elastic Sheet; 16. Charging Interface; 2. Plastic Frame; 21. Upper Frame; 22. Lower Frame; 3. Wound Battery Core Assembly; 31. Positive Tab; 32. Negative Tab; 33. Wound Battery Core; 34. Upper isolating piece; 35. Lower isolating piece; 4. First Metal Housing; 41. contracted portion; 42. positioning hole; 43. Open Hole; 44. Spun Edge; 5. Second Metal Housing; 6. Insulating Seal; 61. Annular Protrusion; 62. Horizontal Sealing Portion; 7. Insulating Sheath; 71. Open Hole; 8. Metal Screw; 9. Plastic Nut; 10. Positive And Negative Electrode isolating piece; 100. Circumferential Welding Spot.

DETAILED DESCRIPTION

The present application will be further described in detail below with reference to FIGS. 1 to 14.

Referring to FIGS. 1 to 5, the present application discloses a voltage-reduced lithium battery, which is specifically an AAA battery, and includes a circuit assembly 1, a plastic frame 2, a wound battery core assembly 3, a first metal housing 4, a second metal housing 5, an insulating seal 6 and an insulating sheath 7. The circuit assembly 1 and the plastic frame 2 are arranged in the first metal housing 4, and the plastic frame 2 is configured to fix the circuit assembly 1. The wound battery core assembly 3 is arranged in the second metal housing 5. The first metal housing 4 docks with the second metal housing 5, and they are fixed with each other by circumferential welding. The insulating seal 6 is arranged between the first metal housing 4 and the second metal housing 5 and configured to seal the second metal housing 5. The insulating sheath 7 covers the first metal housing 4 and the second metal housing 5.

The insulating sheath 7 is preferably made of polyvinyl chloride (PVC), and wraps the first metal housing 4 and the second metal housing 5 by thermal shrinkage to achieve double effects of insulating and covering a circumferential welding spot 100.

Figure 6:
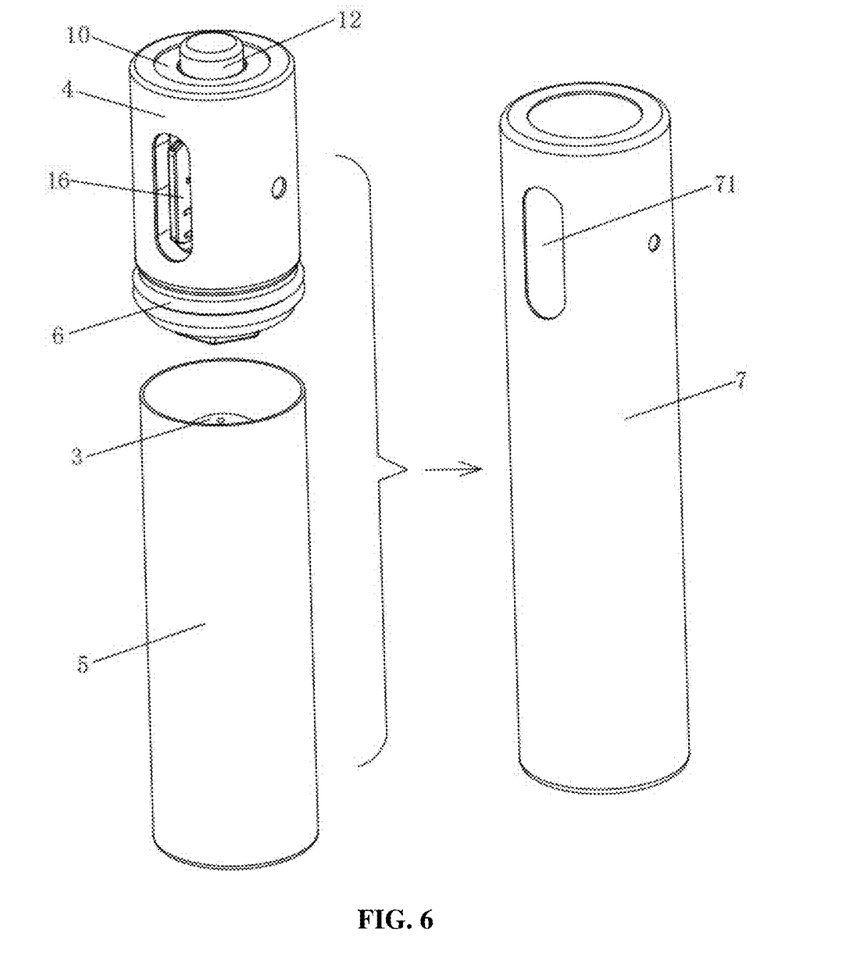
FIG. 6 is a schematic diagram of an overall assembling operation of a voltage-reduced lithium battery according to an embodiment of the present application.
Figure 8:
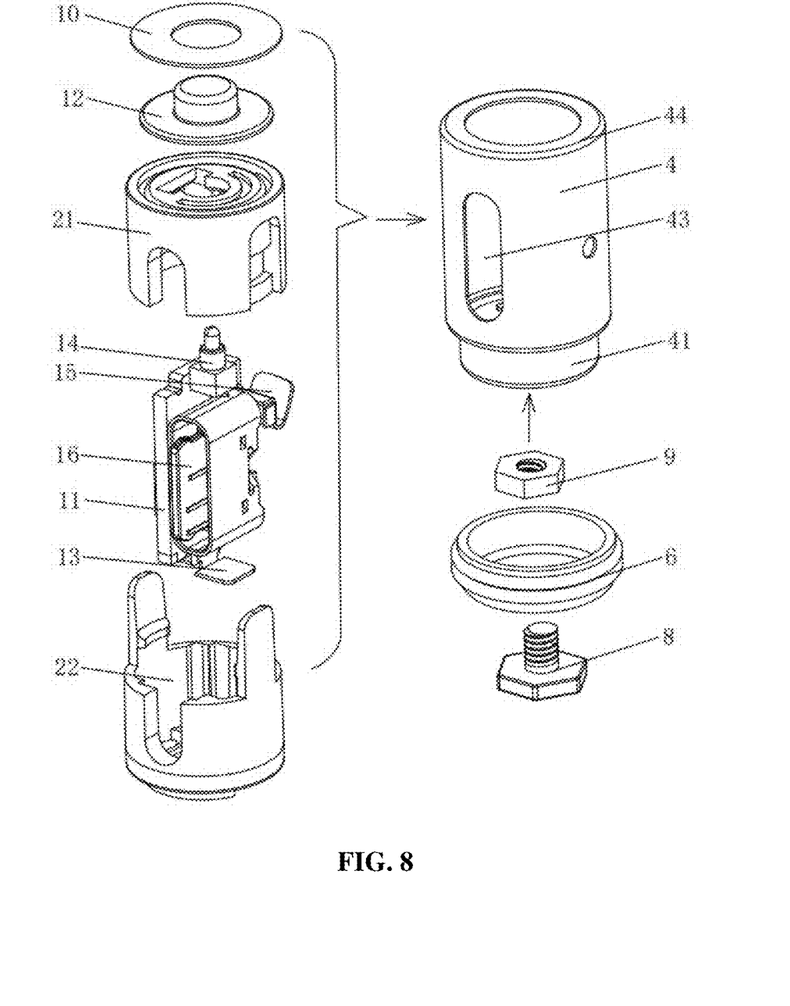
FIG. 8 is a schematic diagram of an assembling operation of mounting a circuit assembly, a plastic frame and other parts into a first metal housing according to an embodiment of the present application.

Referring to FIGS. 6 and 8, a lower end of the first metal housing 4 is provided with a contracted portion 41, and the insulating seal 6 is partially clamped between the contracted portion 41 and the second metal housing 5. The first metal housing 4 and the second metal housing 5 have a same outer diameter, therefore, the insulating seal 6 cannot be arranged when the first metal housing 4 and the second metal housing 5 dock with each other. However, due to the providing of the contracted portion 41, the insulating seal 6 can be sleeved and pressed on the contracted portion 41, to achieve good sealing effect and prevent an electrolyte from leaking out. In addition, an outer annular surface of the insulating seal 6 is provided with one or more annular protrusions 61 which can increase a sealing performance between the insulating seal and the second metal housing 5. A horizontal sealing portion 62 also extends inwards from a bottom of the insulating seal 6, and the horizontal sealing portion 62 is attached to a lower surface of the first metal housing 4, which can improve a sealing performance between the horizontal sealing portion and the first metal housing 4.

In the present application, the wound battery core assembly 3 is directly placed in the second metal housing 5, the plastic frame 2 and the circuit assembly 1 are sealed in the first metal housing 4, and then, an upper end of the second metal housing 5 is completely sealed by the first metal housing 4 and the insulating seal 6. The first metal housing 4 and the second metal housing 5 dock to restrict an up-and-down movement amplitude of the wound battery core assembly 3. The insulating seal 6 is arranged between the first metal housing 4 and the second metal housing 5 which are then fixed by circumferential welding, such that the first metal housing 4 and the second metal housing 5 have high connection strength, damage is not prone to occurrence, a sealing performance is good, and the electrolyte can be effectively prevented from leaking out. The circumferential welding spot 100 is covered by the insulating sheath 7, to avoid influencing user experience. The plastic frame 2 can achieve an isolation effect to prevent unnecessary contact between the circuit assembly 1 and the first metal housing 4, a short circuit is not prone to occurrence, and electrical safety is guaranteed. Only one steel housing is provided outside the wound battery core assembly 3, and compared with the prior art, one steel housing or soft housing is reduced, and a material cost is reduced.

Chinese Patent Application No. CN117673498A titled "Low-Voltage Lithium Battery" discloses a low-voltage lithium battery which can be industrialized, in which, in actual production, a rooling groove is first processed on a metal housing, a wound battery core assembly is fixed in the metal housing, and then, a positive tab is pulled out and welded to a bottom wall of an inner conductive cap, such that a plastic middle frame and a circuit assembly can be put into the metal housing. Due to the above processing process limitation, especially deep extending of an upper end of the wound battery core assembly into the metal housing, a longer positive tab is required; after the lithium battery is assembled, the positive tab is limited in a narrow space, a radial position is uncontrollable, the positive tab has a chance of contacting an inner wall of the metal housing to cause a short circuit, and there exists a serious potential safety hazard.

Figure 1:
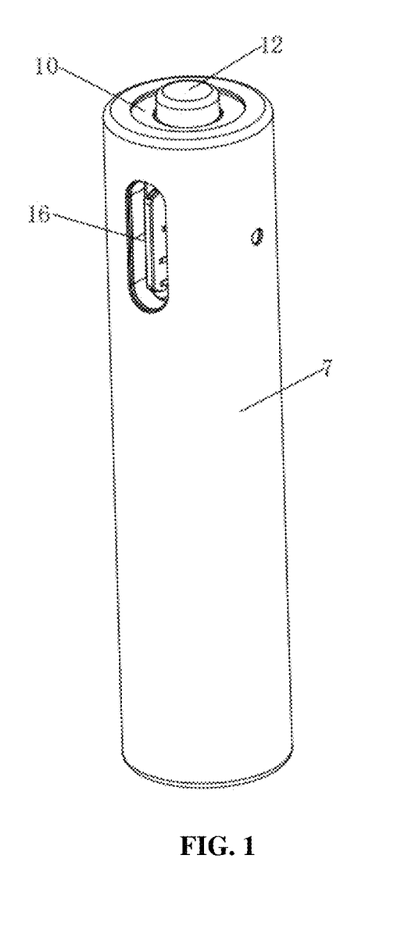
FIG. 1 is a perspective view of a voltage-reduced lithium battery according to an embodiment of the present application.
Figure 2:
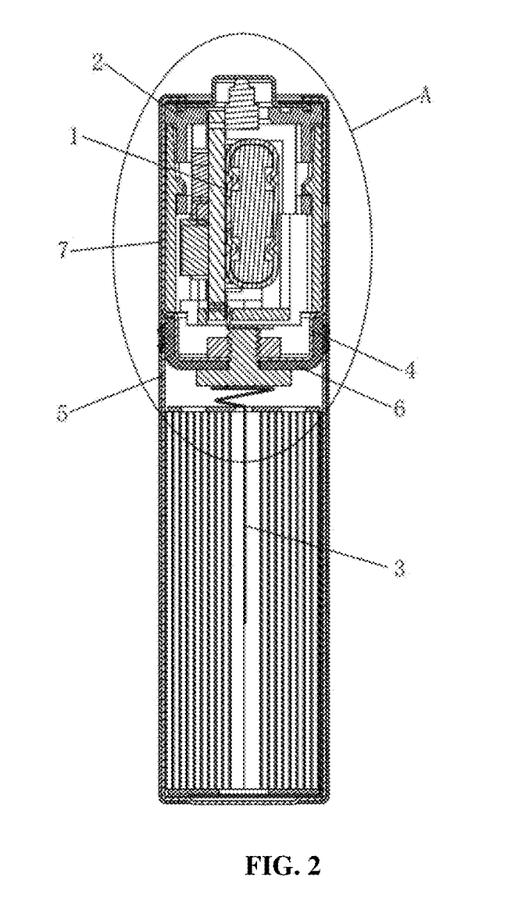
FIG. 2 is a schematic half-section structural diagram of a voltage-reduced lithium battery according to an embodiment of the present application.
Figure 3:
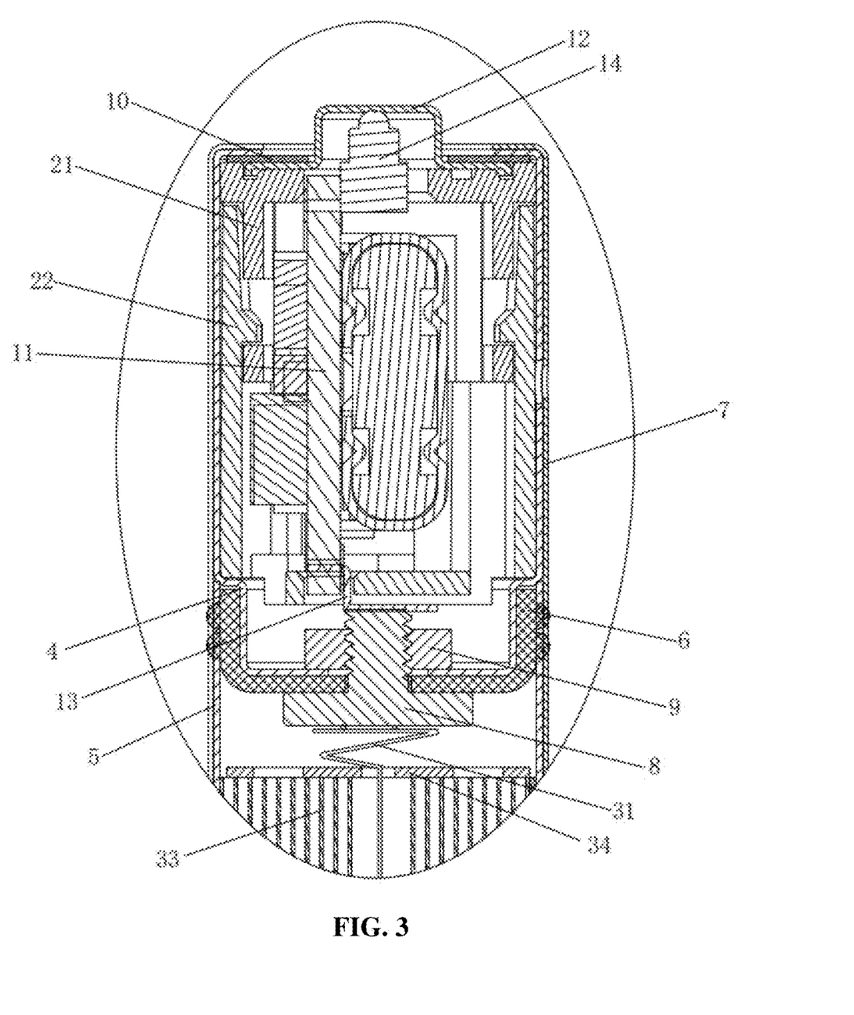
FIG. 3 is an enlarged view of Portion A in FIG. 2.
Figure 4:
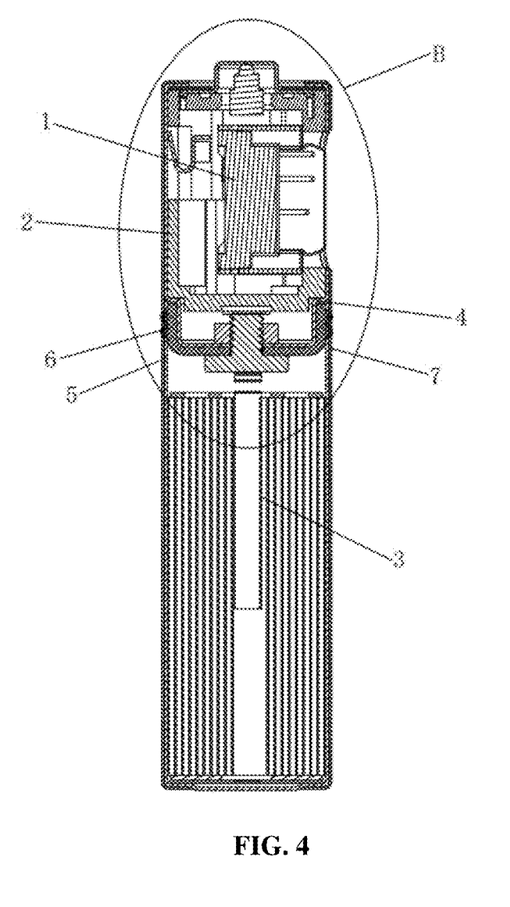
FIG. 4 is a schematic half-section structural diagram of a voltage-reduced lithium battery according to an embodiment of the present application from another perspective.
Figure 11:
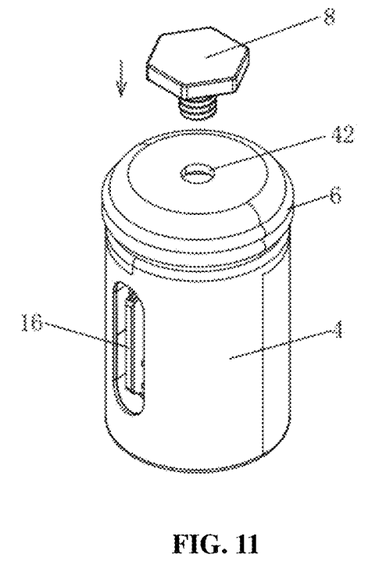
FIG. 11 is a schematic structural diagram of sealing a positioning hole by a metal screw according to an embodiment of the present application.

Referring to FIGS. 3 and 11, a positioning hole 42 is formed in a bottom wall of the first metal housing 4, a metal screw 8 is arranged at the positioning hole 42, and the metal screw 8 is fixed at the positioning hole 42 by a plastic nut 9. The horizontal sealing portion 62 extends between the metal screw 8 and the bottom wall of the first metal housing 4 and is configured to insulate the metal screw 8 relative to the first metal housing 4. The metal screw 8 is also configured to seal the positioning hole 42, such that the electrolyte cannot permeate into the first metal housing 4 through the positioning hole 42.

Figure 9:
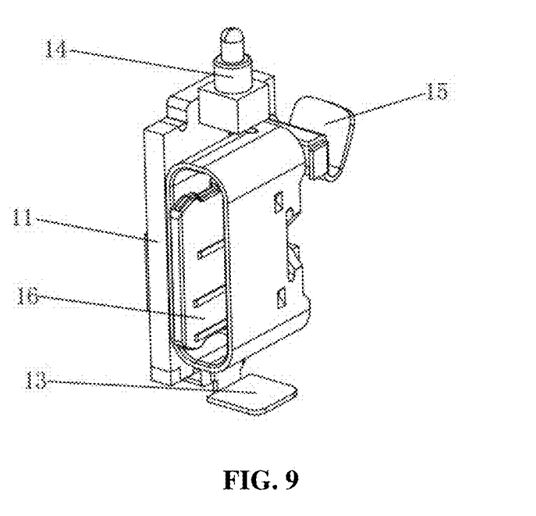
FIG. 9 is a schematic structural diagram of a circuit assembly according to an embodiment of the present application.
Figure 10:
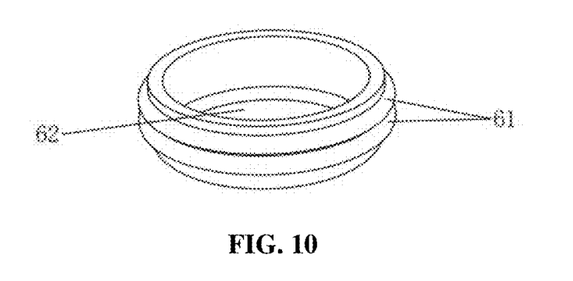
FIG. 10 is a schematic structural diagram of an insulating seal according to an embodiment of the present application.

Referring to FIGS. 3 and 9, the circuit assembly 1 includes a printed circuit board (PCB) 11, a low-voltage positive cap 12, a high-voltage positive connecting piece 13, a low-voltage positive elastic connecting piece 14 and a negative elastic sheet 15, and the low-voltage positive elastic connecting piece 14, the high-voltage positive connecting piece 13 and the negative elastic sheet 15 are all welded on the PCB 11. The negative elastic sheet 15 is in elastic contact with the first metal housing 4, the high-voltage positive connecting piece 13 is in elastic contact with an upper end of the metal screw 8, a positive tab 31 of the wound battery core assembly 3 is welded to a lower end of the metal screw 8, and a negative tab 32 of the wound battery core assembly is welded to the second metal housing 5. The low-voltage positive cap 12 is arranged on the plastic frame 2, and the low-voltage positive elastic connecting piece 14 is in elastic contact with the low-voltage positive cap 12. The metal screw 8 penetrates through the positioning hole 42 of the first metal housing 4, is insulated from the first metal housing 4, and electrically connects the high-voltage positive connecting piece 13 and the positive tab 31 by utilizing conductivity of the metal screw, so as to provide high-voltage power input for the circuit assembly 1.

Figure 5:
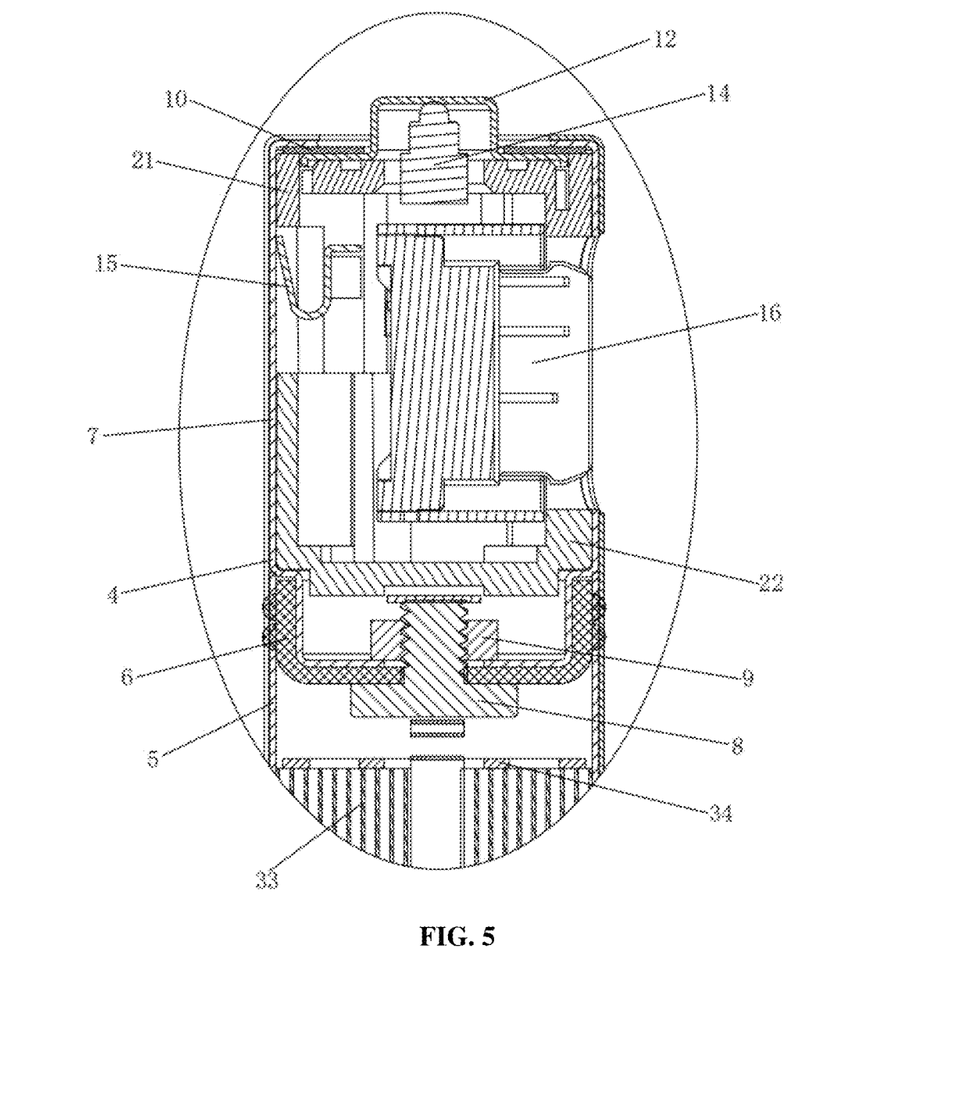
FIG. 5 is an enlarged view of Portion B in FIG. 4.

Referring to FIGS. 5 and 8, a charging interface 16 and the PCB 11 are both vertically placed, and the low-voltage positive cap 12 is placed on the plastic frame 2 and is not directly welded to the PCB 11, such that the low-voltage positive elastic connecting piece 14 is arranged on the PCB 11. The low-voltage positive elastic connecting piece 14 contacts an inner wall of the low-voltage positive cap 12 to realize positive output of a low voltage of 1.5V. The low-voltage positive elastic connecting piece 14 may be a metal elastic sheet, a spring or an elastic ejector pin.

Referring to FIG. 6, the circuit assembly 1 further includes the charging interface 16 which is specifically a TYPE-C interface, and other standard interfaces can be adopted. The charging interface 16 is welded on the PCB 11. Openings 43, 71 are formed in corresponding positions of the first metal housing 4 and the insulating sheath 7 respectively. The first metal housing 4 and the second metal housing 5 are used as common negative electrodes.

Referring to FIG. 8, the plastic frame 2 includes an upper frame 21 and a lower frame 22, the upper frame 21 and the lower frame 22 are fixed by snap connection, and the PCB 11 is fixed between the upper frame 21 and the lower frame 22. Certainly, the upper frame 21 and the lower frame 22 can be fixed using other ways, such as ultrasonic welding, glue pasting, or the like.

Referring to FIGS. 3 and 5, a spun edge 44 is inwards provided at an upper end of the first metal housing 4 and configured to tightly press the plastic frame 2, a positive and negative electrode isolating piece 10 is further arranged below the spun edge 44 (or above the spun edge, as long as the spun edge 44 and the low-voltage positive cap 12 are not overlapped to cause the short circuit), the positive and negative electrode isolating piece 10 is effectively prevented from falling off, and part of an upper surface of the positive and negative electrode isolating piece 10 is further wrapped by the insulating sheath 7, thus further preventing the positive and negative electrode isolating piece 10 from falling off.

Figure 7:
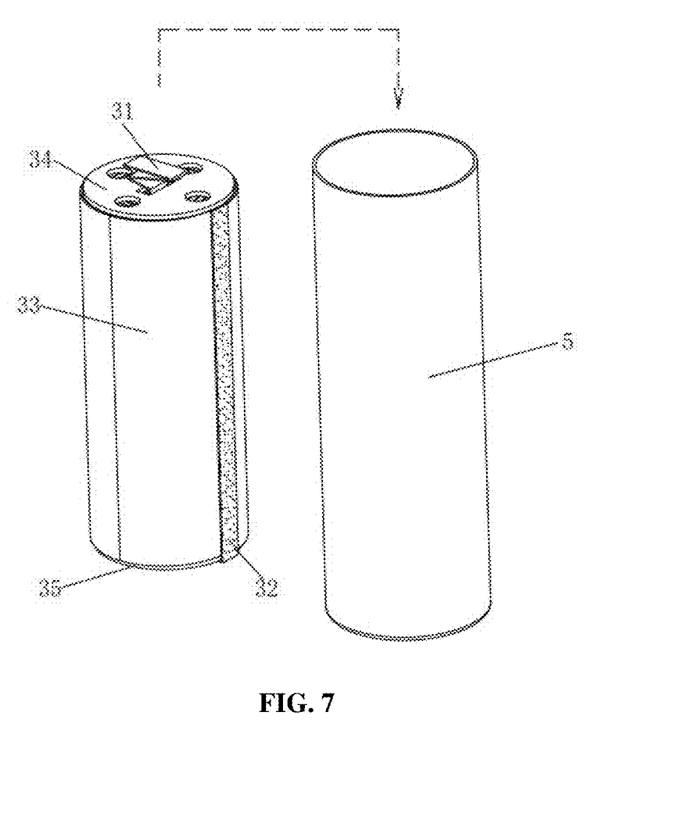
FIG. 7 is a schematic diagram of an assembling operation of mounting a wound battery core assembly on a second metal housing according to an embodiment of the present application.

Referring to FIG. 7, the wound battery core assembly 3 includes a wound battery core 33, an upper isolating piece 34 and a lower isolating piece 35. The positive tab 31 penetrates out of a central hole of the upper isolating piece 34, and an end portion of the positive tab is welded to a lower surface of the metal screw 8. The negative tab 32 is wound from a side surface to a bottom surface of the wound battery core 33, and an end portion of the negative tab is welded to a bottom wall of the second metal housing 5. In the present application, the wound battery core 33 is directly placed in the second metal housing 5, and compared with a soft-package lithium battery core or a hard-housing lithium battery core in the prior art, a wrapping housing is omitted, and a cost is lower.

In the present application, a circuit has the specific connection principle that the positive tab 31 of the wound battery core assembly 3 is connected to the PCB 11 through the metal screw 8 and the high-voltage positive connecting piece 13, the negative tab 32 of the wound battery core assembly 3 is connected to the PCB 11 through the second metal housing 5, the first metal housing 4 and the negative elastic sheet 15, and after a voltage-reduced by the circuit on the PCB 11, a positive voltage of 1.5V is output from the low-voltage positive cap 12, and the negative electrode of the lithium battery is output from the second metal housing 5.

Figure 12:
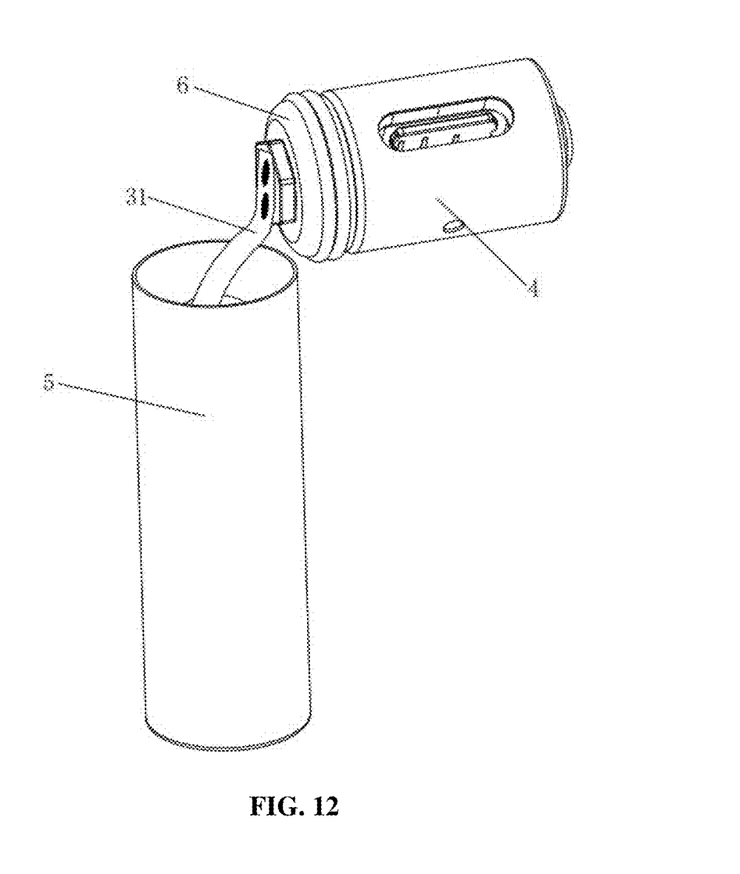
FIG. 12 is a schematic diagram of an operation of welding a positive tab onto the metal screw according to an embodiment of the present application.
Figure 13:
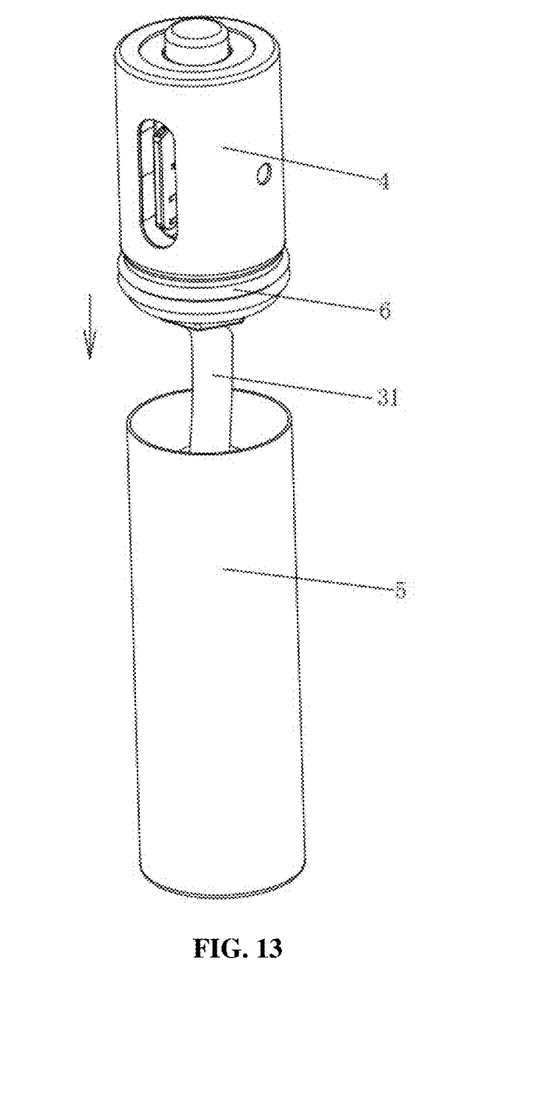
FIG. 13 is a schematic diagram of an operation of mounting a first metal housing and the insulating seal into the second metal housing according to an embodiment of the present application.
Figure 14:
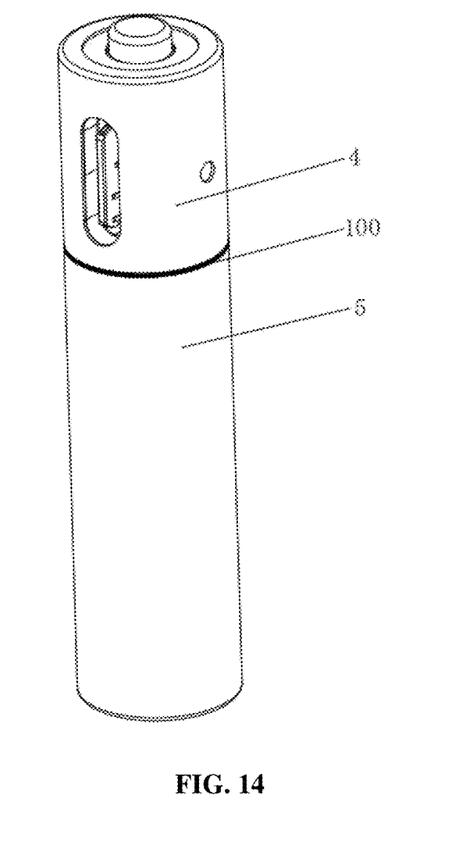
FIG. 14 is a schematic diagram of performing circumferential welding on the first metal housing and the second metal housing according to an embodiment of the present application.

A manufacturing method of the voltage-reduced lithium battery according to the present embodiment includes the following steps:
  S1: sleeving the lower end of the first metal housing 4 with the insulating seal 6, and fixing the metal screw 8 and the plastic nut 9 at the positioning hole 42 of the first metal housing 4;
  S2: fixing the circuit assembly 1 on the plastic frame 2, then mounting the circuit assembly and the plastic frame into the first metal housing 4, making the high-voltage positive connecting piece 13 in the circuit assembly 1 elastically contact the metal screw 8, and making the negative elastic sheet 15 in the circuit assembly 1 elastically contact the first metal housing 4;
  S3: placing the low-voltage positive cap 12 at the plastic frame 2, making the low-voltage positive cap 12 elastically contact the low-voltage positive elastic connecting piece 14, pasting the positive and negative electrode isolating piece 10 on the low-voltage positive cap 12, manufacturing the spun edge 44 at the upper end of the first metal housing 4, and tightly pressing the plastic frame 2, the low-voltage positive cap 12 and the positive and negative electrode isolating piece 10 in the first metal housing 4, the positive and negative electrode isolating piece 10 being capable of preventing the short circuit between the spun edge 44 and the low-voltage positive cap 12;
  S4: mounting the wound battery core assembly 3 into the second metal housing 5, and welding the positive tab 31 of the wound battery core assembly 3 on a bottom surface of the metal screw 8;
  S5: pressing the insulating seal 6 and the lower end of the first metal housing 4 into the second metal housing 5, and performing circumferential welding on the first metal housing 4 and the second metal housing 5; and
  S6: sleeving the obtained assembly with the insulating sheath 7, and performing heating shrinkage to wrap the insulating sheath 7 on the first metal housing 4 and the second metal housing 5.

The manufacturing method according to the present application has a reasonable process and a high yield, and can realize industrialization and large-scale production.

In the present application, the first metal housing 4 and the second metal housing 5 are arranged, the circuit assembly 1 and the plastic frame 2 are sealed in the first metal housing 4, the wound battery core assembly 3 is arranged in the second metal housing 5, and the upper end of the wound battery core assembly 3 is located at a shallow position in the second metal housing 5, such that a required length of the positive tab 31 is shortened. Although the radial position is uncontrollable, the positive tab is not long enough to contact the inner wall of the metal housing, and the short circuit cannot be caused. In addition, the horizontal sealing portion 62 also extends inwardly from the bottom of the insulating seal 6, the lower surface of the first metal housing 4 can be covered, the positive tab 31 is prevented from contacting the lower surface of the first metal housing 4, the short circuit can also be avoided, and therefore, the risk of the short circuit between the positive tab 31 and the metal housing is completely solved.

The above embodiments are preferred embodiments of the present application, and the protection scope of the present application is not limited thereby, and therefore, equivalent changes made according to the structure, shape and principle of the present application shall be covered by the protection scope of the present application.

What is claimed is:

1. A voltage-reduced lithium battery, comprising a circuit assembly, a plastic frame, a wound battery core assembly, a first metal housing, a second metal housing, an insulating seal and an insulating sheath, wherein the circuit assembly and the plastic frame are arranged in the first metal housing, the plastic frame is configured to fix the circuit assembly, the wound battery core assembly is arranged in the second metal housing, the first metal housing and the second metal housing are docked and fixed by circumferential welding, the insulating seal is arranged between the first metal housing and the second metal housing and configured to seal the second metal housing, and the insulating sheath covers the first metal housing and the second metal housing;
  wherein a horizontal sealing portion extends inwardly from a bottom of the insulating seal, and the horizontal sealing portion is attached to a lower surface of the first metal housing to improve a sealing performance between the horizontal sealing portion and the first metal housing;
  wherein a positioning hole is formed in a bottom wall of the first metal housing, a metal screw is arranged at the positioning hole, the metal screw is fixed at the positioning hole by a plastic nut, the horizontal sealing portion extends between the metal screw and the bottom wall of the first metal housing and is configured to insulate the metal screw relative to the first metal housing, and the metal screw is also configured to seal the positioning hole; and wherein the circuit assembly comprises a printed circuit board (PCB), a low-voltage positive cap, a high-voltage positive connecting piece, a low-voltage positive elastic connecting piece and a negative elastic sheet, the low-voltage positive elastic connecting piece, the high-voltage positive connecting piece and the negative elastic sheet are welded on the PCB, the negative elastic sheet is in elastic contact with the first metal housing, the high-voltage positive connecting piece is in elastic contact with an upper end of the metal screw, a positive tab of the wound battery core assembly is welded to a lower end of the metal screw, a negative tab of the wound battery core assembly is welded to the second metal housing, the low-voltage positive cap is arranged on the plastic frame, and the low-voltage positive elastic connecting piece is in elastic contact with the low-voltage positive cap.

2. The voltage-reduced lithium battery according to claim 1, wherein a lower end of the first metal housing is provided with a contracted portion, and the insulating seal is partially clamped between the contracted portion and the second metal housing.

3. The voltage-reduced lithium battery according to claim 2, wherein an outer annular surface of the insulating seal is provided with one or more annular protrusions to increase a sealing performance between the insulating seal and the second metal housing.

4. The voltage-reduced lithium battery according to claim 1, wherein the low-voltage positive elastic connecting piece is a metal elastic sheet, a spring or an elastic ejector pin.

5. The voltage-reduced lithium battery according to claim 1, wherein the circuit assembly further comprises a charging interface, the charging interface is welded on the PCB, and openings are formed in corresponding positions of the first metal housing and the insulating sheath respectively.

6. The voltage-reduced lithium battery according to claim 1, wherein the plastic frame comprises an upper frame and a lower frame, the upper frame and the lower frame are fixed by clamping, and the PCB is fixed between the upper frame and the lower frame.

7. The voltage-reduced lithium battery according to claim 1, wherein a spun edge is inwardly provided at an upper end of the first metal housing and configured to press the plastic frame, a positive and negative electrode isolating piece is further arranged above or below the spun edge, and part of an upper surface of the positive and negative electrode isolating piece is further wrapped by the insulating sheath.

8. The voltage-reduced lithium battery according to claim 1, wherein the wound battery core assembly comprises a wound battery core, an upper isolating piece and a lower isolating piece, the positive tab penetrates out of a central hole of the upper isolating piece, an end portion of the positive tab is welded to a lower surface of the metal screw, the negative tab is wound from a side surface to a bottom surface of the wound battery core, and an end portion of the negative tab is welded to a bottom wall of the second metal housing.

* * * * *